United States Patent
Uenaka

(10) Patent No.: US 7,352,389 B2
(45) Date of Patent: Apr. 1, 2008

(54) ANTI-SHAKE APPARATUS FOR CORRECTING HAND SHAKE EFFECT THROUGH FIRST AND SECOND DRIVE COIL UNITS

(75) Inventor: Yukio Uenaka, Tokyo (JP)

(73) Assignee: PENTAX Corporation, Tokyo (JP)

( * ) Notice: Subject to any disclaimer, the term of this patent is extended or adjusted under 35 U.S.C. 154(b) by 640 days.

(21) Appl. No.: 11/044,054

(22) Filed: Jan. 28, 2005

(65) Prior Publication Data

US 2005/0168584 A1 Aug. 4, 2005

(30) Foreign Application Priority Data

Jan. 30, 2004 (JP) ............... P2004-023518

(51) Int. Cl.
*H04N 5/228* (2006.01)
*G03B 17/00* (2006.01)

(52) U.S. Cl. ............... 348/208.2; 348/208.7; 348/208.11; 396/55

(58) Field of Classification Search ........... 348/208.99, 348/208.2, 208.7; 396/52, 53, 55
See application file for complete search history.

(56) References Cited

U.S. PATENT DOCUMENTS

| | | | |
|---|---|---|---|
| 5,615,397 A * | 3/1997 | Shiomi et al. ............... 396/55 |
| 5,974,269 A | 10/1999 | Sato et al. | |
| 6,307,678 B2 * | 10/2001 | Kosaka et al. ............... 359/557 |
| 6,757,488 B2 * | 6/2004 | Washisu ........................ 396/55 |
| 6,940,542 B2 * | 9/2005 | Kitazawa et al. ......... 348/208.99 |

2003/0067544 A1  4/2003  Wada

FOREIGN PATENT DOCUMENTS

| | | |
|---|---|---|
| JP | 10-142647 | 5/1998 |
| JP | 2002-229090 | 8/2002 |

(Continued)

OTHER PUBLICATIONS

English language abstract of JP 2002-229090, Aug. 14, 2002.

(Continued)

*Primary Examiner*—Ngoc-Yen Vu
*Assistant Examiner*—John Morehead
(74) *Attorney, Agent, or Firm*—Greenblum & Bernstein, P.L.C.

(57) ABSTRACT

An anti-shake-apparatus of a photographing-apparatus comprises a movable-unit and a fixed-unit. The movable-unit has an imaging-device, a first coil-unit having a first driving-coil and a first position-detecting-coil, and a second coil-unit having a second driving-coil and a second position-detecting-coil. The movable-unit is movable in a first-direction and a second-direction. The fixed-unit has a first permanent-magnet and a second permanent-magnet. The first-direction is perpendicular to an optical-axis of the photographing-apparatus. The second-direction is perpendicular to the optical-axis and the first-direction. The first driving-coil and the first permanent-magnet are used for moving the movable-unit in the first-direction. The second driving-coil and the second permanent-magnet are used for moving the movable-unit in the second-direction. The first position-detecting-coil and the first permanent-magnet are used for detecting a first-location in the first-direction of the movable-unit. The second position-detecting-coil and the second permanent-magnet are used for detecting a second-location in the second-direction of the movable-unit.

7 Claims, 8 Drawing Sheets

FOREIGN PATENT DOCUMENTS

JP          2003-110919          4/2003

OTHER PUBLICATIONS

English language abstract of JP 2003-142647, May 16, 2003.
English language abstract of JP 10-142647, May 29, 1998.
U.S. Appl. No. 11/044,055, to Uenaka et al., which was filed Jan. 28, 2005.
U.S. Appl. No. 11/065,577, to Uenaka, which was filed Feb. 25, 2005.
U.S. Appl. No. 11/065,354, to Uenaka et al., which was filed Feb. 25, 2005.
U.S. Appl. No. 11/073,638, to Uenaka et al., which was filed Mar. 8, 2005.
U.S. Appl. No. 11/073,604, to Uenaka, which was filed Mar. 8, 2005.
U.S. Appl. No. 11/071,234, to Uenaka, which was filed Mar. 4, 2005.
U.S. Appl. No. 11/071,220, to Uenaka et al., which was filed Mar. 4, 2005.
U.S. Appl. No. 11/071,241, to Uenaka, which was filed Mar. 4, 2005.
U.S. Appl. No. 11/071,242, to Uenaka, which was filed Mar. 4, 2005.
U.S. Appl. No. 11/078,367, to Seo, which was filed Mar. 14, 2005.

* cited by examiner

ANTI-SHAKE APPARATUS FOR CORRECTING HAND SHAKE EFFECT THROUGH FIRST AND SECOND DRIVE COIL UNITS

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or the imaging device on a plane that is perpendicular to the optical axis, corresponding to the amount of hand-shake which occurs during imaging.

Japanese unexamined patent publication (KOKAI) No. 2002-229090 discloses an anti-shake apparatus for a photographing apparatus. The anti-shake apparatus performs a moving operation of a movable unit, which includes a hand-shake correcting lens, by using a permanent magnet and a coil, and a position-detecting operation of the movable unit, by using a hall element and a permanent magnet.

Japanese unexamined patent publication (KOKAI) No. 2003-110919 discloses an anti-shake apparatus for a photographing apparatus. The anti-shake apparatus performs a moving operation of a movable unit, which includes an imaging device, by using a piezoelectric element, and a position-detecting operation of the movable unit, by using a position sensitive device (PSD).

However, these anti-shake apparatuses need exclusive sensors (a hall element or a position sensitive device) which are used for the position-detecting operation. These sensors prevent downsizing of the anti-shake apparatus.

SUMMARY OF THE INVENTION

Therefore, an object of the present invention is to provide an apparatus which can perform a position-detecting operation of the movable unit without using an exclusive sensor, in the anti-shake apparatus.

According to the present invention, an anti-shake apparatus of a photographing apparatus comprises a movable unit and a fixed unit.

The movable unit has one of an imaging device and a hand-shake correcting lens, and has a first coil unit having a first driving coil and a first position-detecting coil, and has a second coil unit having a second driving coil and a second position-detecting coil. The movable unit is movable in a first direction and a second direction.

The fixed unit has a first permanent magnet and a second permanent magnet.

The first direction is perpendicular to an optical axis of a camera lens of the photographing apparatus.

The second direction is perpendicular to the optical axis and the first direction.

The first driving coil and the first permanent magnet are used for moving the movable unit in the first direction.

The second driving coil and the second permanent magnet are used for moving the movable unit in the second direction.

The first position-detecting coil and the first permanent magnet are used for detecting a first location in the first direction of the movable unit.

The second position-detecting coil and the second permanent magnet are used for detecting a second location in the second direction of the movable unit.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the FIGS. 1~8. In this embodiment, the photographing device 1 is a digital camera. The photographing device 1 has an optical axis LX.

Figure 1:
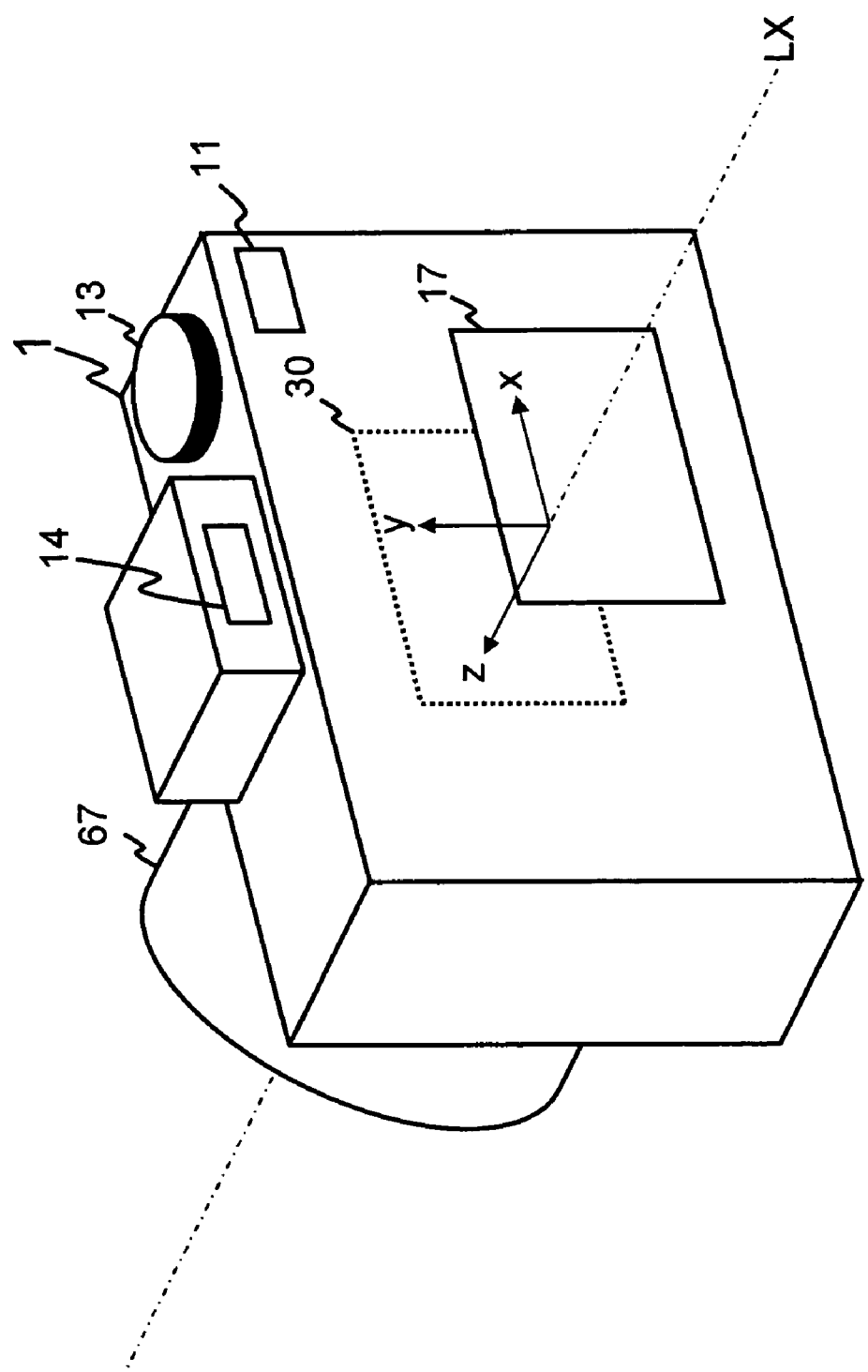
FIG. 1 is a perspective view of a photographing apparatus of the embodiment viewed from the back side of the photographing apparatus.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

Figure 4:
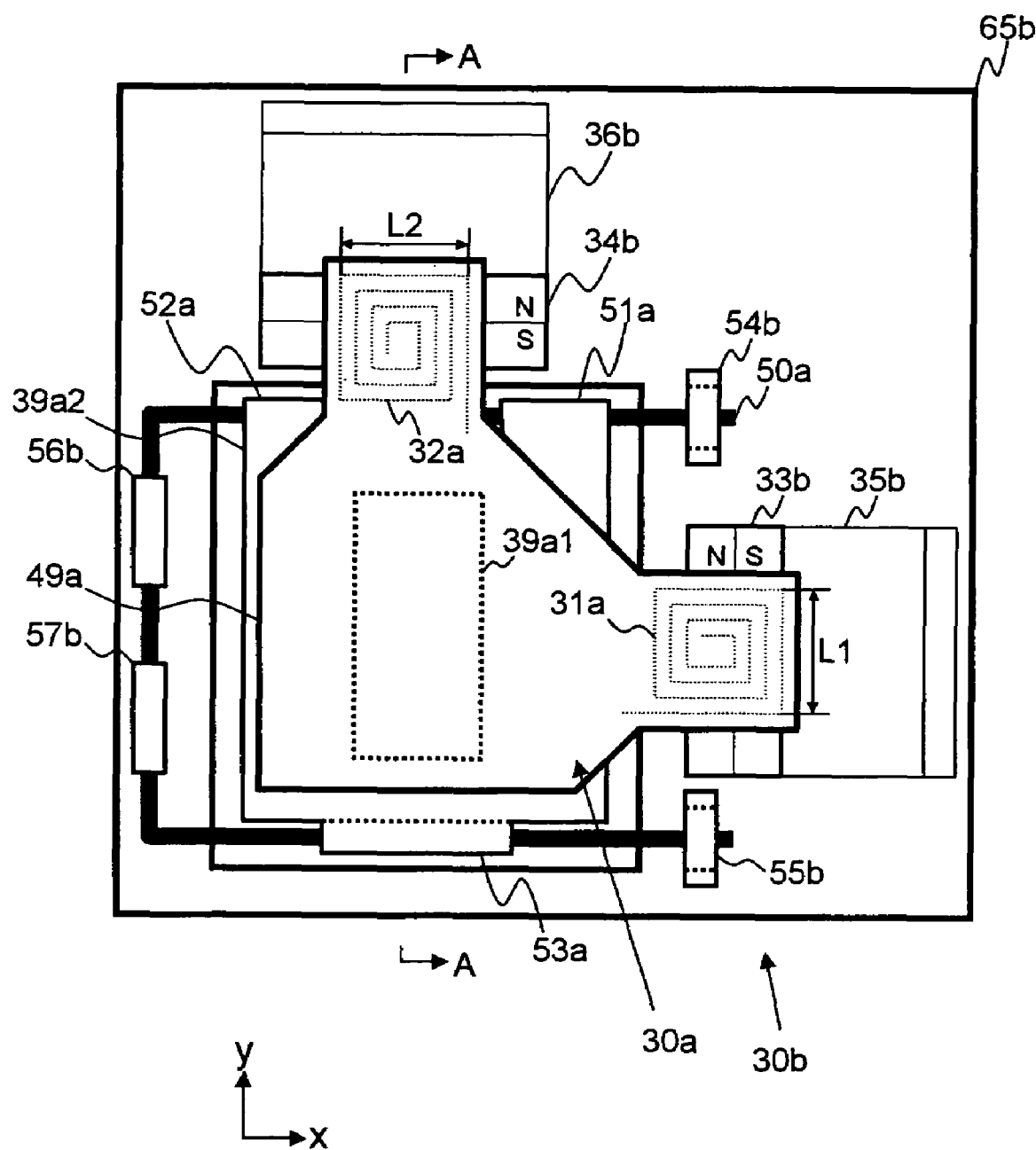
FIG. 4 is a figure showing the construction of the anti-shake apparatus.
Figure 5:
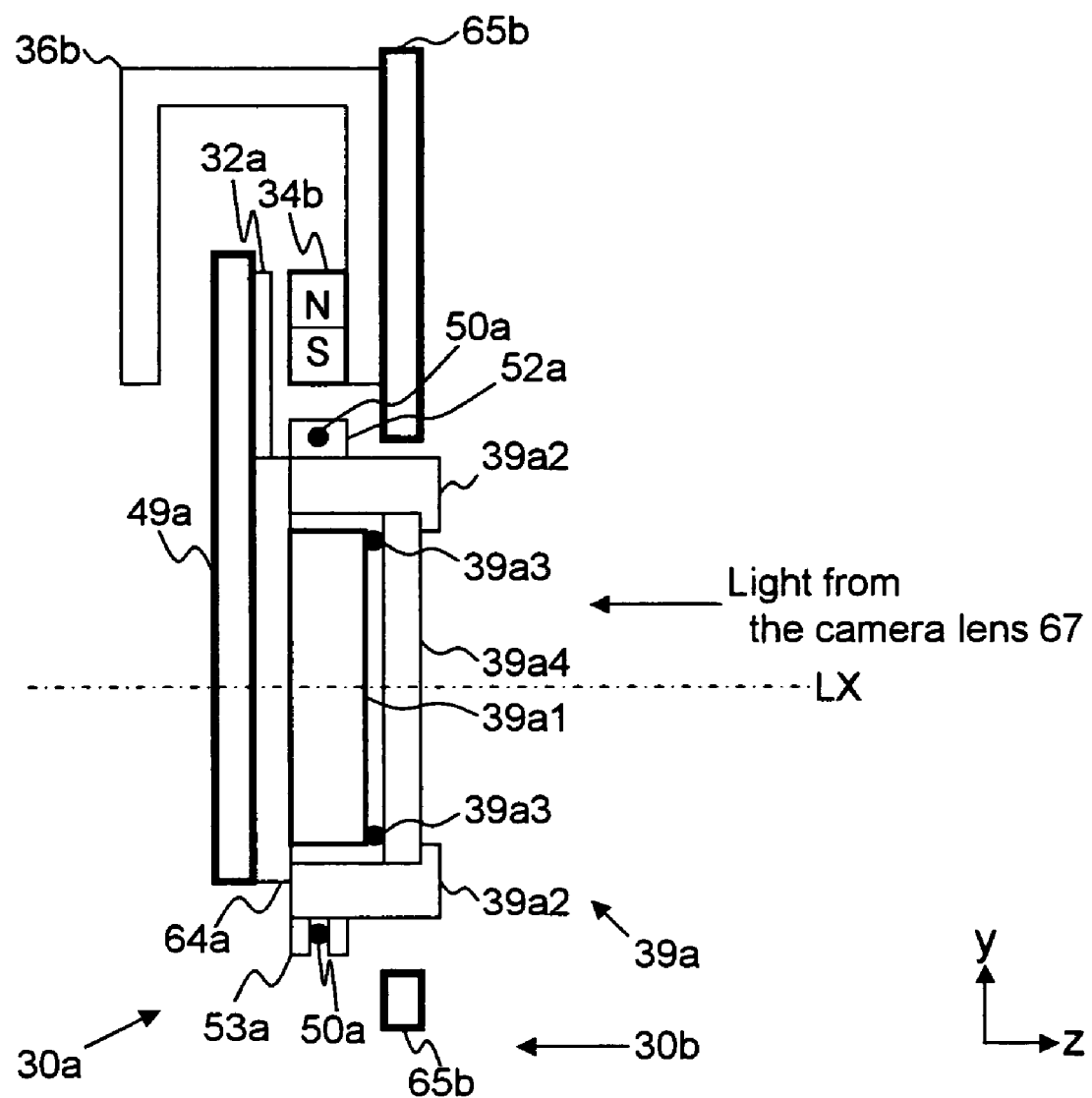
FIG. 5 is a view along line A-A of FIG. 4.

FIG. 5 shows a construction diagram of the section along line A-A of FIG. 4.

Figure 2:
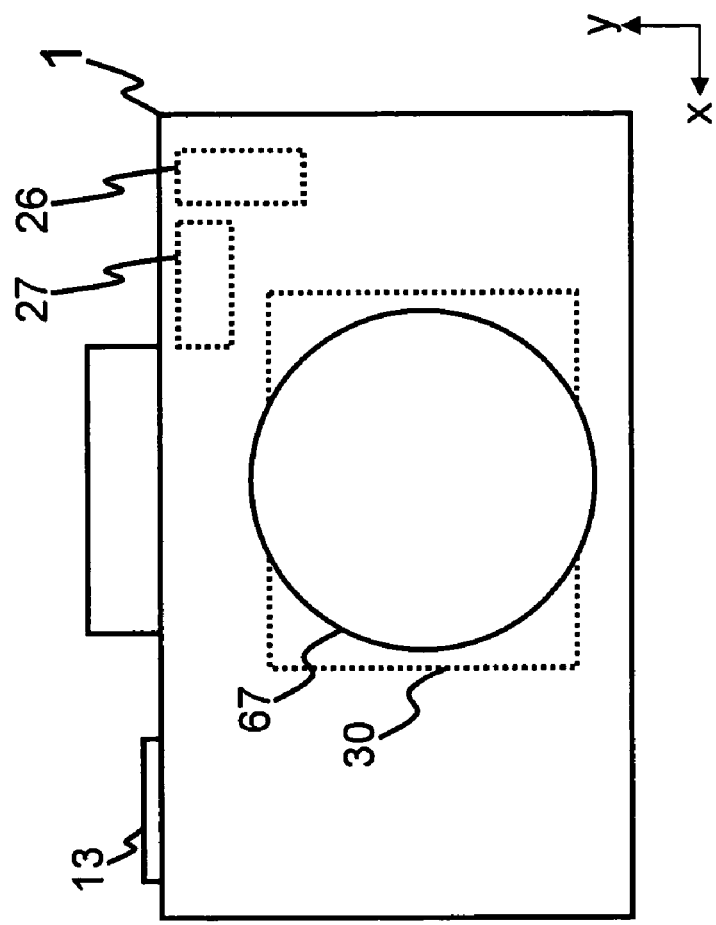
FIG. 2 is a front view of the photographing apparatus.
Figure 3:
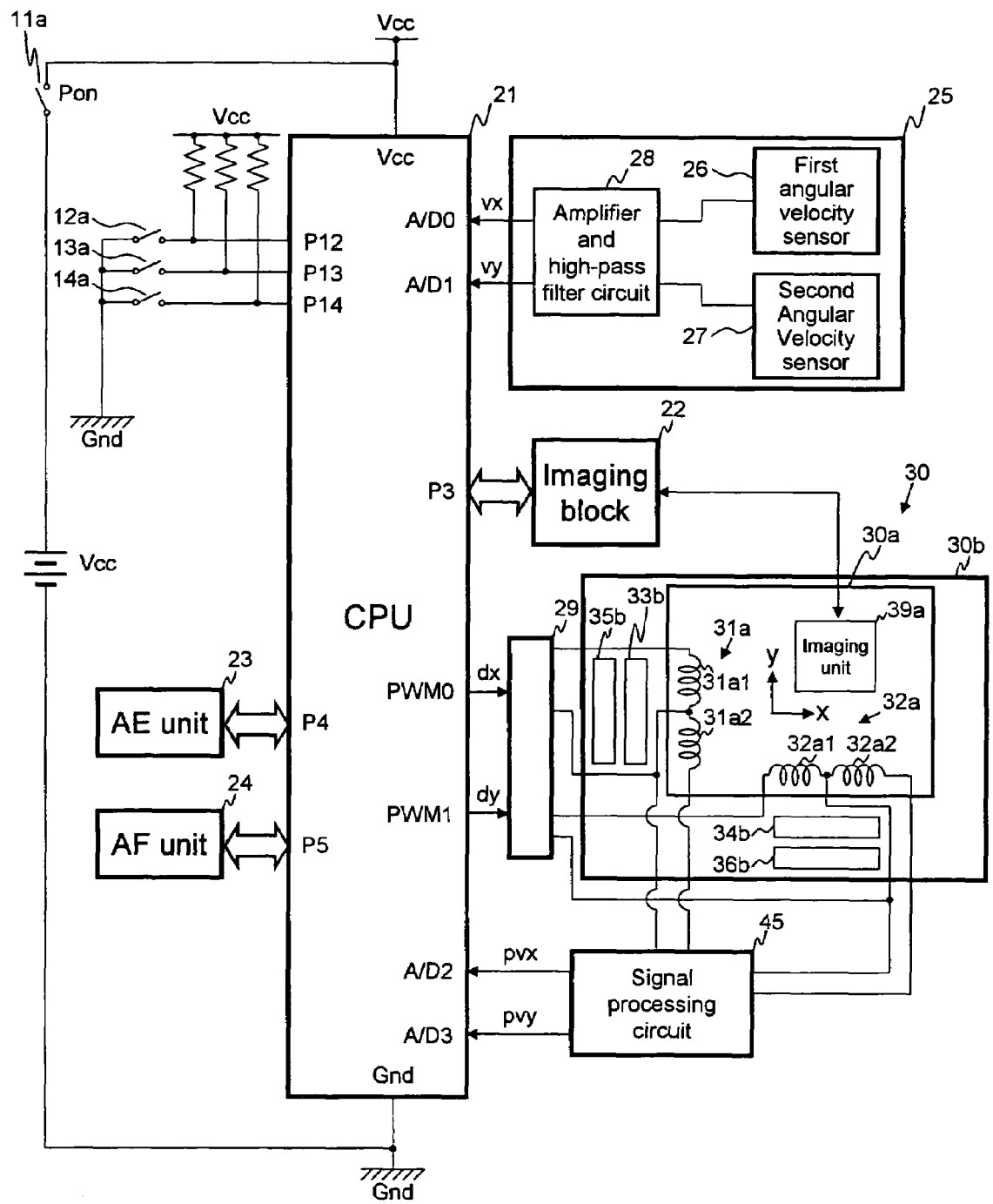
FIG. 3 is a circuit construction diagram of the photographing apparatus.

The imaging part of the photographing apparatus 1 comprises a Pon button 11, a Pon switch 11a, a photometric switch 12a, a release button 13, a release switch 13a, a CPU 21, an imaging block 22, an AE (automatic exposure) unit 23, an AF (automatic focusing) unit 24, an imaging unit 39a in the anti-shake apparatus 30, and a camera lens 67 (see FIGS. 1, 2, and 3).

Whether the Pon switch 11a is in the on state or the off state, is determined by a state of the Pon button 11, so that the ON/OFF states of the photographing apparatus 1 are changed corresponding to the ON/OFF states of the Pon switch 11a.

The photographic subject image is taken as an optical image through the camera lens 67 by the imaging block 22, which drives the imaging unit 39a, so that the image, which is taken, is indicated on the LCD monitor 17. The photographic subject image can be optically observed by the optical finder (not depicted).

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the camera lens 67 is moved in the optical axis LX direction.

The anti-shaking part of the photographing apparatus 1 comprises an anti-shake button 14, an anti-shake switch 14a, a CPU 21, an angular velocity detecting unit 25, a driver circuit 29, an anti-shake apparatus 30, a signal processing circuit 45, and the camera lens 67.

When the anti-shake button 14 is fully pushed by the operator, the anti-shake switch 14a changes to the on state, so that the anti-shake operation is performed where the angular velocity detecting unit 25 and the anti-shake apparatus 30 are driven, at every predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0). In this embodiment, the predetermined time interval is 1 ms.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

Next, the details of the input and output relationship with the CPU 21 for the angular velocity unit 25, the driver circuit 29, the anti-shake apparatus 30, and the signal processing circuit 45 are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to the digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved, corresponding to the hand-shake quantity which is calculated, for the first direction x and the second direction y. The location in the first direction x of the position S is defined sx, and the location in the second direction y of the position S is defined sy. The movement of the movable unit 30a, which includes the imaging unit 39a, is performed by using electro-magnetic force and is described later. The driving force D, which drives the driver circuit 29 in order to move the movable unit 30a to the position S, has a first PWM duty dx as the driving-force component in the first direction x and a second PWM duty dy as the driving-force component in the second direction y.

The anti-shake apparatus 30 is an apparatus which corrects the hand-shake effect, by moving the imaging unit 39a to the position S, by canceling lag of the photographic subject image on the imaging surface of the imaging device 39a1, and by stabilizing the photographing subject image that reaches the imaging surface of the imaging device 39a1.

The anti-shake apparatus 30 has a movable unit 30a, which includes the imaging unit 39a, and a fixed unit 30b. Or, the anti-shake apparatus 30 is composed of a driving part which moves the movable unit 30a by electro-magnetic force to the position S, and a position-detecting part which detects the position of the movable unit 30a. Detecting the position of the movable unit 30a (a detected-position P) is performed by detecting a movement-velocity of the movable unit 30a (a detected-velocity PV) on the basis of electro-motive force caused by electro-magnetic induction, and by integrating the movement-velocity of the movable unit 30a with respect to time.

The size and the direction of the electro-magnetic force are determined by the size and the direction of the current which flows in the coil, and the size and the direction of the magnetic-field of the magnet.

The size and the direction of the electromotive force caused by electro-magnetic induction are determined by the size of the force and the direction of the movement of the coil, and the size and the direction of the magnetic-field of the magnet.

The driving of the movable unit 30a of the anti-shake apparatus 30, is performed by the driver circuit 29 which has the first PWM duty dx input from the PWM 0 of the CPU 21 and has the second PWM duty dy input from the PWM 1 of the CPU 21, and by the first and second coil units 31*a* and 32*a*, and by the first and second permanent magnets 33*b* and 34*b*.

The detected-velocity PV of the movable unit 30*a*, either before moving or after moving, which is moved by driving the driver circuit 29, is detected by the first and second coil units 31*a* and 32*a*, the first and second permanent magnets 33*b* and 34*b*, and the signal processing circuit 45.

Information for the detected-velocity PV for the velocity-component in the first direction x, in other words a first detected-velocity signal pvx is input to the A/D converter A/D 2 of the CPU 21. The first detected-velocity signal pvx is an analogue signal, and is converted to the digital signal through the A/D converter A/D 2 (A/D converting operation). The velocity-component in the first direction x for the detected-velocity PV, after the A/D converting operation, is defined as a first movement-velocity data pvdx, corresponding to the first detected-velocity signal pvx.

The first movement-velocity data pvdx is integrated with respect to time, so that the first location in the first direction x for the detected-position P, which is defined as pdx, is calculated by this time-integration, corresponding to the first detected-velocity signal pvx.

Information for the detected-velocity PV for the velocity-component in the second direction y, in other words a second detected-velocity signal pvy is input to the A/D converter A/D 3 of the CPU 21. The second detected-velocity signal pvy is an analogue signal, and is converted to the digital signal through the A/D converter A/D 3 (A/D converting operation). The velocity-component in the second direction y for the detected-velocity PV, after the A/D converting operation, is defined as a second movement-velocity data pvdy, corresponding to the second detected-velocity signal pvy.

The second movement-velocity data pvdy is integrated with respect to time, so that the second location in the second direction y for the detected-position P, which is defined as pdy, is calculated by this time-integration, corresponding to the second detected-velocity signal pvy.

The PID (Proportional Integral Differential) control is performed on the basis of the data for the detected-position P (pdx, pdy) and the data for the position S (sx, sy) which should be moved to.

The movable unit 30*a* has a first coil unit 31*a*, a second coil unit 32*a*, an imaging unit 39*a*, a movable circuit board 49*a*, a shaft for movement 50*a*, a first bearing unit for horizontal movement 51*a*, a second bearing unit for horizontal movement 52*a*, a third bearing unit for horizontal movement 53*a*, and a plate 64*a* (see FIGS. 4 and 5).

The fixed unit 30*b* has a first permanent magnet 33*b*, a second permanent magnet 34*b*, a first yoke 35*b*, a second yoke 36*b*, a first bearing unit for vertical movement 54*b*, a second bearing unit for vertical movement 55*b*, a third bearing unit for vertical movement 56*b*, a fourth bearing unit for vertical movement 57*b*, and a base board 65*b*.

The shaft for movement 50*a* of the movable unit 30*a* has a channel shape when viewed from the third direction z. The first, second, third, and fourth bearing units for vertical movement 54*b*, 55*b*, 56*b*, and 57*b* are attached to the base board 65*b* of the fixed unit 30*b*. The shaft for movement 50*a* is slidably supported in the vertical direction (the second direction y), by the first, second, third, and fourth bearing units for vertical movement 54*b*, 55*b*, 56*b*, and 57*b*.

The first and second bearing units for vertical movement 54*b* and 55*b* have slots which extend in the second direction y.

Therefore, the movable unit 30*a* can move relative to the fixed unit 30*b*, in the vertical direction (the second direction y).

The shaft for movement 50*a* is slidably supported in the horizontal direction (the first direction x), by the first, second, and third bearing units for horizontal movement 51*a*, 52*a*, and 53*a* of the movable unit 30*a*. Therefore, the movable unit 30*a*, except for the shaft for movement 50*a*, can move relative to the fixed unit 30*b* and the shaft for movement 50*a*, in the horizontal direction (the first direction x).

When the center area of the imaging device 39*a*1 is located on the optical axis LX of the camera lens 67, the location relation between the movable unit 30*a* and the fixed unit 30*b* is set up so that the movable unit 30*a* is located at the center of its movement range in both the first direction x and the second direction y, in order to utilize the full size of the imaging range of the imaging device 39*a*1.

A rectangle shape, which forms the imaging surface of the imaging device 39*a*1, has two diagonal lines. In this embodiment, the center of the imaging device 39*a*1 is the crossing point of these two diagonal lines.

The imaging unit 39*a*, the plate 64*a*, and the movable circuit board 49*a* are attached, in this order along the optical axis LX direction, viewed from the side of the camera lens 67. The imaging unit 39*a* has an imaging device 39*a*1 (such as a CCD or a COMS etc.), a stage 39*a*2, a holding unit 39*a*3, and an optical low-pass filter 39*a*4. The stage 39*a*2 and the plate 64*a* hold and urge the imaging device 39*a*1, the holding unit 39*a*3, and the optical low-pass filter 39*a*4 in the optical axis LX direction.

The first, second, and third bearing units for horizontal movement 51*a*, 52*a*, and 53*a* are attached to the stage 39*a*2. The imaging device 39*a*1 is attached to the plate 64*a*, so that positioning of the imaging device 39*a*1 is performed where the imaging device 39*a*1 is perpendicular to the optical axis LX of the camera lens 67. Further, the plate 64*a* is made of a metallic material, so that the plate 64*a* has the effect of radiating heat from the imaging device 39*a*1, by contacting the imaging device 39*a*1.

The first coil unit 31*a* and the second coil unit 32*a* are attached to the movable circuit board 49*a*. The first coil unit 31*a* and the second coil unit 32*a* are connected with the driver circuit 29.

The first coil unit 31*a* has a first driving coil 31*a*1 and a first position-detecting coil 31*a*2. The second coil unit 32*a* has a second driving coil 32*a*1 and a second position-detecting coil 32*a*2.

The coil pattern of the first driving coil 31*a*1 has lines which are parallel to either the first direction x or the second direction y, where the movable unit 30*a* which includes the first driving coil 31*a*1, is moved in the first direction x, by a first electro-magnetic force. The lines which are parallel to the second direction y, are used for moving the movable unit 30*a* in the first direction x. The lines which are parallel to the second direction y, have a first effective length L1.

The first electro-magnetic force occurs on the basis of the current direction of the first driving coil 31*a*1 and the first magnetic-field direction of the first permanent magnet 33*b*.

The coil pattern of the second driving coil 32*a*1 has lines which are parallel to either the first direction x or the second direction y, where the movable unit 30*a* which includes the second driving coil 32*a*1, is moved in the second direction y, by a second electromagnetic force. The lines which are parallel to the first direction x, are used for moving the movable unit 30a in the second direction y. The lines which are parallel to the first direction x, have a second effective length L2.

The second electro-magnetic force occurs on the basis of the current direction of the second driving coil 32a1 and the second magnetic-field direction of the second permanent magnet 34b.

The first and second driving coils 31a1 and 32a1 are connected with the driver circuit 29 which drives the first and second driving coils 31a1 and 32a1 through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a1 corresponding to the value of the first PWM duty dx, and to the second driving coil 32a1 corresponding to the value of the second PWM duty dy, to drive the movable unit 30a.

The coil pattern of the first position-detecting coil 31a2 has lines which are parallel to either the first direction x or the second direction y, where a first electromotive force occurs between terminals of the first position-detecting coil 31a2 caused by electromagnetic induction, for detecting the first detected-velocity signal pvx. The first detected-velocity signal pvx is used for calculating the first location in the first direction x for the detected-position P of the movable unit 30a (pdx).

The lines which are parallel to the second direction y, are used for detecting the first detected-velocity signal pvx. The lines which are parallel to the second direction y, have a first effective length L1.

The first electromotive force caused by electro-magnetic induction occurs on the basis of a first movement of the first position-detecting coil 31a2 being included in the movable unit 30a, and of a first magnetic-field of the first permanent magnet 33b.

The size and the direction of the first electromotive force caused by electro-magnetic induction are determined by the size of the force and the direction of the first movement of the first position-detecting coil 31a2, and by the size and the direction of the first magnetic-field of the first permanent magnet 33b.

The coil pattern of the second position-detecting coil 32a2 has lines which are parallel to either the first direction x or the second direction y, where a second electromotive force occurs between terminals of the second position-detecting coil 32a2 caused by electro-magnetic induction, for detecting the second detected-velocity signal pvy. The second detected-velocity signal pvy is used for calculating the second location in the second direction y for the detected-position P of the movable unit 30a (pdy).

The lines which are parallel to the first direction x, are used for detecting the second detected-velocity signal pvy. The lines which are parallel to the first direction x, have a second effective length L2.

The second electromotive force caused by electro-magnetic induction occurs on the basis of a second movement of the second position-detecting coil 32a2 being included in the movable unit 30a and of a second magnetic-field of the second permanent magnet 34b.

The size and the direction of the second electromotive force caused by electro-magnetic induction are determined by the size of the force and the direction of the second movement of the second position-detecting coil 32a2, and by the size and the direction of the second magnetic-field of the second permanent magnet 34b.

The first and second position-detecting coils 31a2 and 32a2 are connected with the signal processing circuit 45 which drives the first and second position-detecting coils 31a2 and 32a2 through the flexible circuit board (not depicted). The signal processing circuit 45 outputs the first detected-velocity signal pvx to the A/D converter A/D 2 corresponding to a signal (the first electromotive force) in the first position-detecting coil 31a2, and outputs the second detected-velocity signal pvy to the A/D converter A/D 3 corresponding to a signal (the second electromotive force) in the second position-detecting coil 32a2.

The first driving coil 31a1 and the first position-detecting coil 31a2 are wound, such that their outer circumference shapes, viewed from the third direction z, are rectangles and face the first permanent magnet 33b. The external structures of the rectangles form lines which are parallel to one of the first direction x and the second direction y (see FIG. 6).

Because the circumference shapes of the windings of the first driving coil 31a1 and the first position-detecting coil 31a2, which face the fixed unit 30b, are rectangular shaped, moving the movable unit 30a in the first direction x is not influenced by movement of the movable unit 30a in the second direction y. Further, detecting the position (moving velocity) of the movable unit 30a in the first direction x is not influenced by movement of the movable unit 30a in the second direction y.

The second driving coil 32a1 and the second position-detecting coil 32a2 are wound, such that their outer circumference shapes, viewed from the third direction z, are rectangles and face the second permanent magnet 34b. The external structures of the rectangles form lines which are parallel to one of the first direction x and the second direction y.

Because the circumference shapes of the windings of the second driving coil 32a1 and the second position-detecting coil 32a2, which face the fixed unit 30b, are rectangular shaped, moving the movable unit 30a in the second direction y is not influenced by movement of the movable unit 30a in the first direction x. Further, detecting the position (moving velocity) of the movable unit 30a in the second direction y is not influenced by movement of the movable unit 30a in the first direction x.

Figure 6:
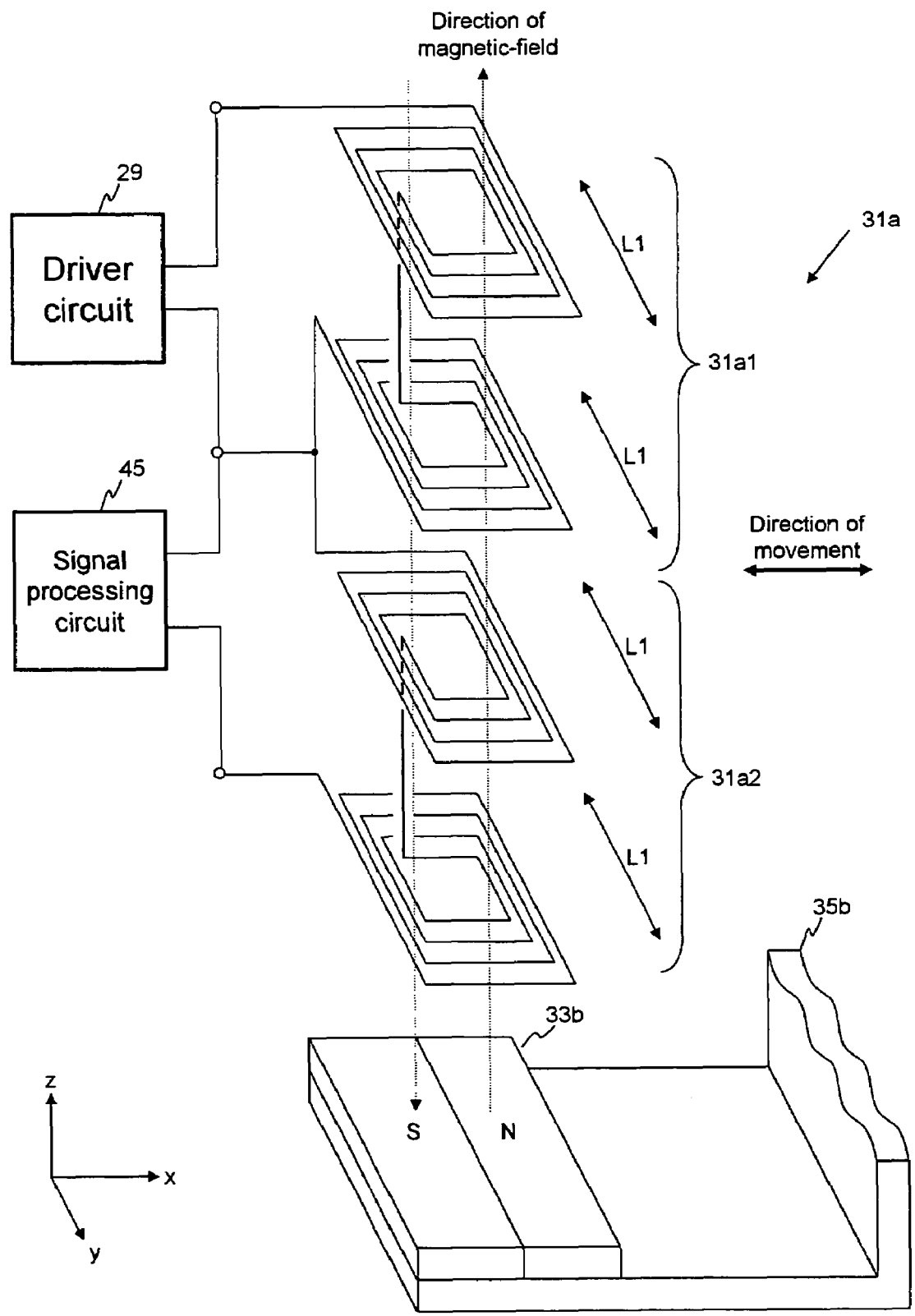
FIG. 6 is a construction figure of the first driving coil and first position-detecting coil.

The first and second driving coils 31a1 and 32a1, and the first and second position-detecting coils 31a2 and 32a2 form seat and spiral shape coil patterns. FIG. 6 shows that the first driving coil 31a1 has two seat coils which are layered in the third direction z, and the first position-detecting coil 31a2 has two seat coils which are layered in the third direction z, the first driving coil 31a1 and the first position-detecting coil 31a2 are layered in the third direction z.

Similarly, the second driving coil 32a1 has two seat coils which are layered in the third direction z, the second position-detecting coil 32a2 has two seat coils which are layered in the third direction z, and the second driving coil 32a1 and the second position-detecting coil 32a2 are layered in the third direction z (not depicted).

The first permanent magnet 33b is attached to the movable unit side of the fixed unit 30b, where the first permanent magnet 33b faces the first coil unit 31a in the third direction z.

The second permanent magnet 34b is attached to the movable unit side of the fixed unit 30b, where the second permanent magnet 34b faces the second coil unit 32a in the third direction z.

The first permanent magnet 33b is attached to the first yoke 35b, under the condition where the N pole and S pole are arranged in the first direction x. The first yoke 35b is attached to the base board 65*b* of the fixed unit 30*b*, on the side of the movable unit 30*a*, in the third direction Z.

The length of the first permanent magnet 33*b* in the second direction y, is longer in comparison with the first effective length L1 of the first coil unit 31*a*. The magnetic-field which influences the first coil unit 31*a*, is not changed during movement of the movable unit 30*a* in the second direction y.

The lines of the first driving coil 31*a*1 which are parallel to the second direction y, are used for moving the movable unit 30*a* in the first direction x by the first electro-magnetic force. The lines of the first position-detecting coil 31*a*2 which are parallel to the second direction y, are used for detecting the first detected-velocity signal pvx on the basis of the first electromotive force caused by electromagnetic induction.

It is explained that the first driving coil 31*a*1 and the first position-detecting coil 31*a*2 have the same first effective length L1. However, an effective length of the first driving coil 31*a*1 and an effective length of the first position-detecting coil 31*a*2 may not be the same, that is, the length of the first permanent magnet 33*b* in the second direction y, is longer in comparison with the effective length of the first driving coil 31*a*1 and the effective length of the first position-detecting coil 31*a*2 etc.

The second permanent magnet 34*b* is attached to the second yoke 36*b*, under the condition where the N pole and S pole are arranged in the second direction y. The second yoke 36*b* is attached to the base board 65*b* of the fixed unit 30*b*, on the side of the movable unit 30*a*, in the third direction z.

The length of the second permanent magnet 34*b* in the first direction x, is longer in comparison with the second effective length L2 of the second coil unit 32*a*. The magnetic-field which influences the second coil unit 32*a*, is not changed during movement of the movable unit 30*a* in the first direction x.

The lines of the second driving coil 32*a*1 which are parallel to the first direction x, are used for moving the movable unit 30*a* in the second direction y by the second electro-magnetic force. The lines of the second position-detecting coil 32*a*2 which are parallel to the first direction x, are used for detecting the second detected-velocity signal pvy on the basis of the second electromotive force caused by electro-magnetic induction.

It is explained that the second driving coil 32*a*1 and the second position-detecting coil 32*a*2 have the same second effective length L2. However, an effective length of the second driving coil 32*a*1 and an effective length of the second position-detecting coil 32*a*2 may not be the same, that is, the length of the second permanent magnet 34*b* in the first direction x, is longer in comparison with the effective length of the second driving coil 32*a*1 and the effective length of the second position-detecting coil 32*a*2 etc.

Accordingly, moving the movable unit 30*a* in the first direction x, and detecting the position (moving velocity) of the movable unit 30*a* in the first direction x (the first detected-velocity pvx), can be achieved by using one permanent magnet (the first permanent magnet 33*b*) and one coil unit (the first coil unit 31*a*).

The first driving coil 31*a*1 and the first position-detecting coil 31*a*2 are integrated to form to one coil unit (the first coil unit 31*a*). Accordingly, in this embodiment, adding a hall element and a PSD element etc. for detecting the position of the movable unit 30*a*, is not needed, so that it is possible to downsize the permanent magnet and the yoke. Therefore, it is possible to downsize the anti-shake apparatus.

Further, even if the first driving coil 31*a*1 consists of some seat coils which are layered in the third direction z, and the first position-detecting coil 31*a*2 consists of some seat coils which are layered in the third direction z, the thickness of the first coil unit 31*a*, which consists of the first driving coil 31*a*1 and the first position-detecting coil 31*a*2 in the third direction z, is not increased in the third direction z. Therefore, it is possible to reduce the size of the first coil unit 31*a*, in comparison with when the first driving coil 31*a*1 and the first position-detecting coil 31*a*2 are arranged in the first direction x or the second direction y.

Similarly, moving the movable unit 30*a* in the second direction y, and detecting the position (moving velocity) of the movable unit 30*a* in the second direction y (the second detected-velocity pvy), can be achieved by using one permanent magnet (the second permanent magnet 34*b*) and one coil unit (the second coil unit 32*a*).

The second driving coil 32*a*1 and the second position-detecting coil 32*a*2 are integrated to form one coil unit (the second coil unit 32*a*). Accordingly, in this embodiment, adding a hall element and a PSD element etc. for detecting the position of the movable unit 30*a*, is not needed, so that it is possible to downsize the permanent magnet and the yoke. Therefore, it is possible to downsize the anti-shake apparatus.

Further, even if the second driving coil 32*a*1 consists of some seat coils which are layered in the third direction z, and the second position-detecting coil 32*a*2 consists of some seat coils which are layered in the third direction z, the thickness of the second coil unit 32*a*, which consists of the second driving coil 32*a*1 and the second position-detecting coil 32*a*2 in the third direction z, is not increased in the third direction z. Therefore, it is possible to reduce the size of the second coil unit 32*a*, in comparison with when the second driving coil 32*a*1 and the second position-detecting coil 32*a*2 are arranged in the first direction x or the second direction y.

The first yoke 35*b* is made of a soft magnetic material, and forms a square-u-shape channel when viewed from the second direction y. The first permanent magnet 33*b* and the first coil unit 31*a* are inside the channel of the first yoke 35*b*.

The side of the first yoke 35*b*, which contacts the first permanent magnet 33*b*, prevents the first magnetic-field of the first permanent magnet 33*b* from leaking to the surroundings.

The other side of the first yoke 35*b*, which faces the first permanent magnet 33*b*, the first coil unit 31*a*, and the movable circuit board 49*a*, raises the magnetic-flux density between the first permanent magnet 33*b* and the first coil unit 31*a*.

The second yoke 36*b* is made of a soft magnetic material, and forms a square-u-shape channel when viewed from the first direction x. The second permanent magnet 34*b* and the second coil unit 32*a* are inside the channel of the second yoke 36*b*.

The side of the second yoke 36*b*, which contacts the second permanent magnet 34*b*, prevents the second magnetic-field of the second permanent magnet 34*b* from leaking to the surroundings.

The other side of the second yoke 36*b*, which faces the second permanent magnet 34*b*, the second coil unit 32*a*, and the movable circuit board 49*a*, raises the magnetic-flux density between the second permanent magnet 34*b* and the second coil unit 32*a*.

The base board 65b is a plate state member which becomes the base for attaching the first yoke 35b etc., and is arranged being parallel to the imaging surface of the imaging device 39a1.

In this embodiment, the base board 65b is arranged at the side nearer to the camera lens 67 in comparison with the movable circuit board 49a, in the third direction z. However, the movable circuit board 49a may be arranged at the side nearer to the camera lens 67 in comparison with the base board 65b. In this case, the first and second coil units 31a and 32a are arranged on the opposite side of the movable circuit board 49a to the camera lens 67, so that the first and second permanent magnets 33b and 34b are arranged on the same side of the movable circuit board 49a as the camera lens 67.

The signal processing circuit 45 detects a first potential-difference between the terminals of the first position-detecting coil 31a2, based on the first electromotive force caused by electro-magnetic induction.

The signal processing circuit 45 outputs the first detected-velocity signal pvx, which specifies the first location in the first direction x of the movable unit 30a, to the A/D converter A/D 2 of the CPU 21, on the basis of the first potential-difference.

The signal processing circuit 45 detects a second potential-difference between the terminals of the second position-detecting coil 32a2, based on the second electromotive force caused by electro-magnetic induction.

The signal processing circuit 45 outputs the second detected-velocity signal pvy, which specifies the second location in the second direction y of the movable unit 30a, to the A/D converter A/D 3 of the CPU 21, on the basis of the second potential-difference.

Figure 7:
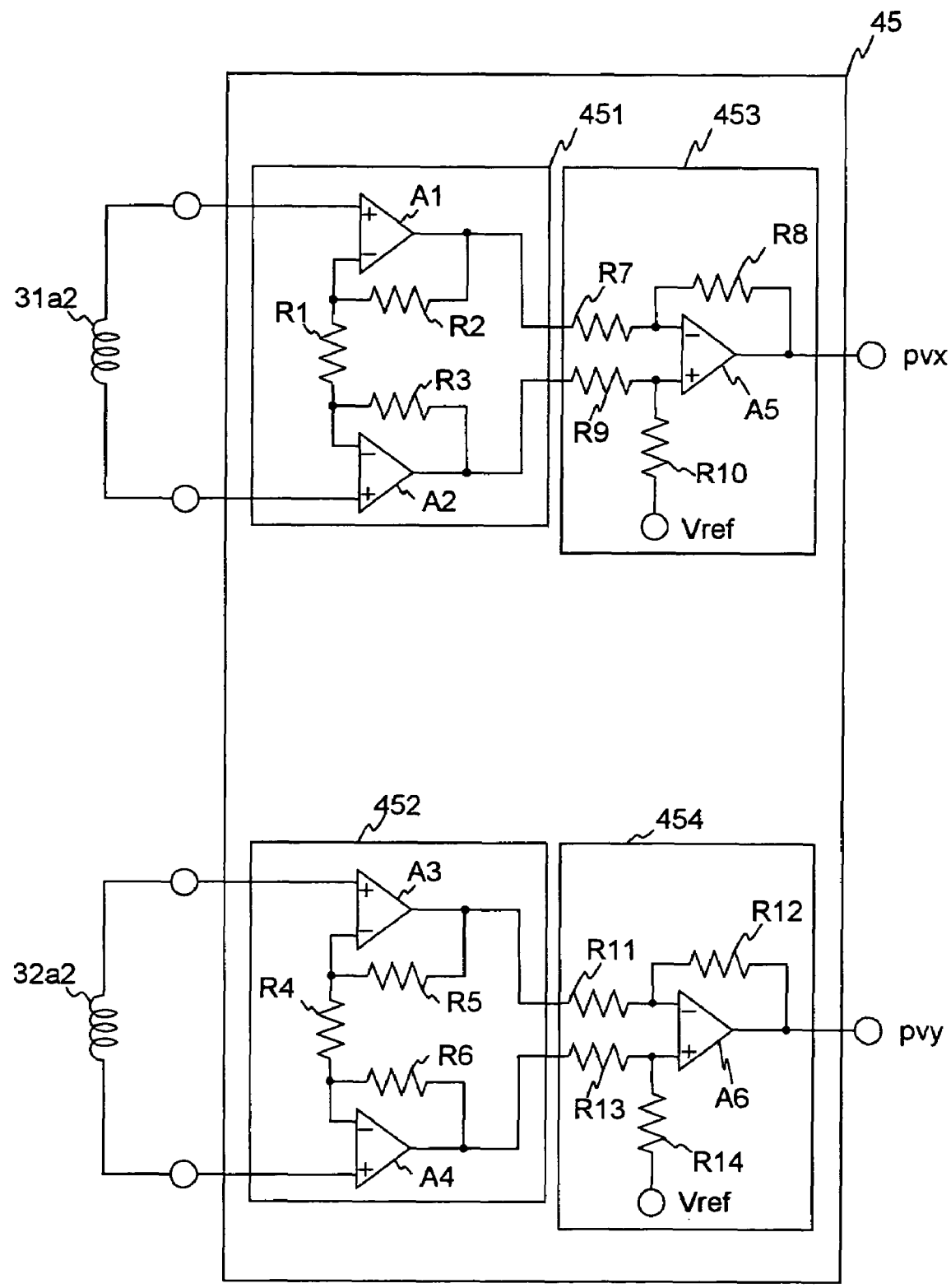
FIG. 7 is a circuit construction diagram of the first and second position-detecting coils and the signal processing circuit.

The circuit construction in the signal processing circuit 45 is explained using FIG. 7. The signal processing circuit 45 has a circuit 451, a circuit 452, a circuit 453, and a circuit 454.

Both terminals of the first position-detecting coil 31a2 are connected with the circuit 451, so that the circuit 451 is connected with the circuit 453.

Both terminals of the second position-detecting coil 32a2 are connected with the circuit 452, so that the circuit 452 is connected with the circuit 454.

The circuit 451 is a differential amplifier circuit which amplifies the first potential-difference between the terminals of the first position-detecting coil 31a2, so that the circuit 452 is a differential amplifier circuit which amplifies the second potential-difference between the terminals of the second position-detecting coil 32a2.

The circuit 453 is a subtracting circuit, which calculates the first detected-velocity signal pvx on the basis of the difference between the amplified first potential-difference from the circuit 451 and a reference voltage Vref.

The circuit 454 is a subtracting circuit which calculates the second detected-velocity signal pvy on the basis of the difference between the amplified second potential-difference from the circuit 452 and the reference voltage Vref.

The circuit 451 has a resistor R1, a resistor R2, a resistor R3, an operational amplifier A1, and an operational amplifier A2. The operational amplifier A1 has an inverting input terminal, a non-inverting input terminal, and an output terminal. The operational amplifier A2 has an inverting input terminal, a non-inverting input terminal, and an output terminal.

One of the terminals of the first position-detecting coil 31a2 is connected with the non-inverting input terminal of the operational amplifier A1, so that the other terminal of the first position-detecting coil 31a2 is connected with the non-inverting input terminal of the operational amplifier A2.

The inverting input terminal of the operational amplifier A1 is connected with the resistors R1 and R2, so that the inverting input terminal of the operational amplifier A2 is connected with the resistors R1 and R3.

The output terminal of the operational amplifier A1 is connected with the resistor R2 and the resistor R7 in the circuit 453. The output terminal of the operational amplifier A2 is connected with the resistor R3 and the resistor R9 in the circuit 453.

The circuit 452 has a resistor R4, a resistor R5, a resistor R6, an operational amplifier A3, and an operational amplifier A4. The operational amplifier A3 has an inverting input terminal, a non-inverting input terminal, and an output terminal. The operational amplifier A4 has an inverting input terminal, a non-inverting input terminal, and an output terminal.

One of the terminals of the second position-detecting coil 32a2 is connected with the non-inverting input terminal of the operational amplifier A3, so that the other terminal of the second position-detecting coil 32a2 is connected with the non-inverting input terminal of the operational amplifier A4.

The inverting input terminal of the operational amplifier A3 is connected with the resistors R4 and R5, so that the inverting input terminal of the operational amplifier A4 is connected with the resistor R4 and R6.

The output terminal of the operational amplifier A3 is connected with the resistor R5 and the resistor R11 in the circuit 454. The output terminal of the operational amplifier A4 is connected with the resistor R6 and the resistor R13 in the circuit 454.

The circuit 453 has a resistor R7, a resistor R8, a resistor R9, a resistor R10, and an operational amplifier A5. The operational amplifier A5 has an inverting input terminal, a non-inverting input terminal, and an output terminal.

The inverting input terminal of the operational amplifier A5 is connected with the resistors R7 and R8. The non-inverting input terminal of the operational amplifier A5 is connected with the resistors R9 and R10. The output terminal of the operational amplifier A5 is connected with the resistor R8. The first detected-velocity pvx is output from the output terminal of the operational amplifier A5. One of the terminals of the resistor R10 is connected with the power supply whose voltage is the reference voltage Vref.

The circuit 454 has a resistor R11, a resistor R12, a resistor R13, a resistor R14, and an operational amplifier A6. The operational amplifier A6 has an inverting input terminal, a non-inverting input terminal, and an output terminal.

The inverting input terminal of the operational amplifier A6 is connected with the resistors R11 and R12. The non-inverting input terminal of the operational amplifier A6 is connected with the resistors R13 and R14. The output terminal of the operational amplifier A6 is connected with the resistor R12. The second detected-velocity pvy is output from the output terminal of the operational amplifier A6. One of the terminals of the resistor R14 is connected with the power supply whose voltage is the reference voltage Vref.

The values of the resistors R2 and R3 are the same. The values of the resistors R5 and R6 are the same. The values of the resistors R7~R10 are the same. The values of the resistors R11~R14 are the same.

The operational amplifiers A1 and A2 are the same type of amplifier. The operational amplifiers A3 and A4 are the same type of amplifier.

Figure 8:
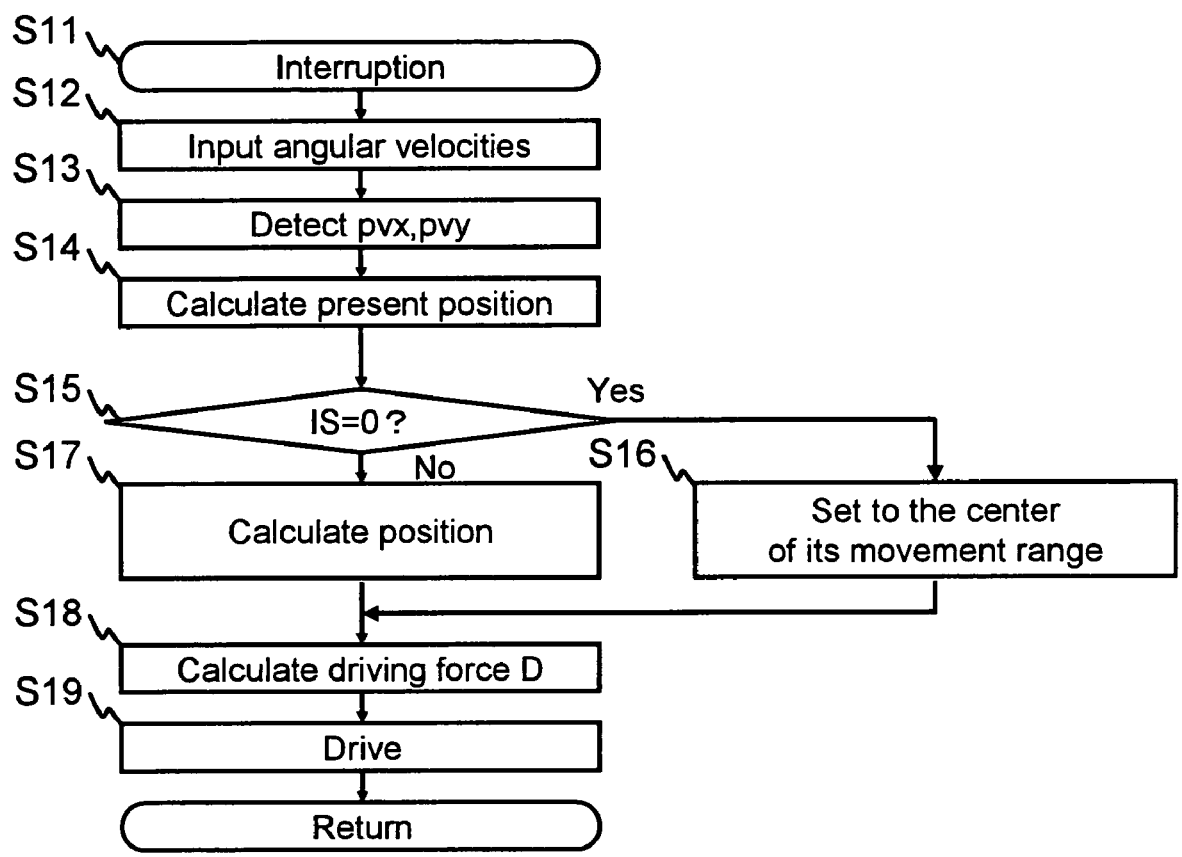
FIG. 8 is a flowchart of the anti-shake operation, which is performed at every predetermined time interval, as an interruption process.

Next, the flow of the anti-shake operation, which is performed at every predetermined time interval (1 ms) as an interruption process, independently of the other operations, is explained by using the flowchart in FIG. 8.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the velocity of the movable unit 30a in the predetermined time (1 ms) is detected by the first and second position-detecting coils 31a2 and 32a2, so that the first detected-velocity signal pvx, which is calculated by the signal processing circuit 45, is input to the A/D converter A/D 2 of the CPU 21 and is converted to a digital signal (the first movement-velocity data pvdx), and the second detected-velocity signal pvy, which is calculated by the signal processing circuit 45, is input to the A/D converter A/D 3 of the CPU 21 and is converted to a digital signal (the second movement-velocity data pvdy).

In step S14, the first movement-velocity data pvdx is integrated with respect to time (the moving time 1 ms), and the second movement-velocity data pvdy is integrated with respect to time (the moving time 1 ms), so that the present position of the movable unit 30a P (pdx, pdy) is determined.

In step S15, it is judged whether the value of the IS is 0. When it is judged that the value of the IS is 0 (IS=0), in other words in the non anti-shake mode, the position S (sx, sy) of the movable unit 30a (the imaging unit 39a), which should be moved, is set to the center of its movement range, in step S16. When it is judged that the value of the IS is not 0 (IS=1), in other words in the anti-shake mode, the position S (sx, sy) of the movable unit 30a (the imaging unit 39a), which should be moved, is calculated on the basis of the first and second angular velocities vx and vy, in step S17.

In step S18, the driving force D, which drives the driver circuit 29 in order to move the movable unit 30a to the position S, in other words the first PWM duty dx and the second PWM duty dy, is calculated on the basis of the position S (sx, sy), which is determined in step S16 or step S17, and the present position P (pdx, pdy).

In step S19, the first driving coil unit 31a1 is driven by using the first PWM duty dx, through the driver circuit 29, and the second driving coil unit 32a1 is driven by using the second PWM duty dy, through the driver circuit 29, so that the movable unit 30a is moved.

The process in steps S18 and S19 is an automatic control calculation, which is used with the PID automatic control for performing general (normal) proportional, integral, and differential calculations.

Further, it is explained that the movable unit 30a has the imaging device 39a1. However, the movable unit 30a may have a hand-shake correcting lens instead of the imaging device.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2004-023518 (filed on Jan. 30, 2004), which is expressly incorporated herein by reference, in its entirety.

The invention claimed is:

1. An anti-shake apparatus of a photographing apparatus, comprising:
    a movable unit that has one of an imaging device and a hand-shake correcting lens, and has a first coil unit having a first driving coil and a first position-detecting coil, and has a second coil unit having a second driving coil and a second position-detecting coil, and is movable in a first direction and a second direction; and
    a fixed unit that has a first permanent magnet and a second permanent magnet;
    said first direction being perpendicular to an optical axis of a camera lens of said photographing apparatus;
    said second direction being perpendicular to said optical axis and said first direction;
    said first driving coil and said first permanent magnet being used for moving said movable unit in said first direction;
    said second driving coil and said second permanent magnet being used for moving said movable unit in said second direction;
    said first position-detecting coil and said first permanent magnet being used for detecting a first location in said first direction of said movable unit; and
    said second position-detecting coil and said second permanent magnet being used for detecting a second location in said second direction of said movable unit.

2. The anti-shake apparatus according to claim 1, wherein a first electromotive force, caused by electro-magnetic induction, occurs on the basis of a first movement of said first position-detecting coil being included in said movable unit and of a first magnetic-field of said first permanent magnet;
    detecting said first location is performed by using a first detected-velocity signal as a velocity of said first movement in said first direction corresponding to said first electromotive force, and a time length of said first movement;
    a second electromotive force, caused by electro-magnetic induction, occurs on the basis of a second movement of said second position-detecting coil being included in said movable unit and of a second magnetic-field of said second permanent magnet; and
    detecting said second location is performed by using a second detected-velocity signal as a velocity of said second movement in said second direction corresponding to said second electromotive force, and a time length of said second movement.

3. The anti-shake apparatus according to claim 2, wherein the size and the direction of said first electromotive force caused by the electro-magnetic induction, is determined by the size of the force and the direction of said first movement, and by the size and the direction of said first magnetic-field; and
    the size and the direction of said second electromotive force caused by the electro-magnetic induction, is determined by the size of the force and the direction of said second movement, and by the size and the direction of said second magnetic-field.

4. The anti-shake apparatus according to claim 1, wherein said first coil unit is wound, such that its circumference shape, viewed from a third direction which is parallel to said optical axis, is a rectangle and faces said first permanent magnet;
    an external structure of said rectangle of said first coil unit, forms lines which are parallel to one of said first direction and said second direction;

said second coil unit is wound, such that its circumference shape, viewed from said third direction, is a rectangle and faces said second permanent magnet;

an external structure of said rectangle of said second coil unit, forms lines which are parallel to one of said first direction and said second direction;

said first permanent magnet is attached to said fixed unit under the condition where the N pole and S pole are arranged in said first direction; and said second permanent magnet is attached to said fixed unit under the condition where the N pole and S pole are arranged in said second direction.

5. The anti-shake apparatus according to claim 4, wherein said first driving coil forms a seat and spiral shape coil pattern;

said second driving coil forms a seat and spiral shape coil pattern;

said first position-detecting coil forms a seat and spiral shape coil pattern; and said second position-detecting coil forms a seat and spiral shape coil pattern.

6. The anti-shake apparatus according to claim 5, wherein said seat and spiral shape coil pattern of said first driving coil and said seat and spiral shape coil pattern of said first position-detecting coil are layered in said third direction; and said seat and spiral shape coil pattern of said second driving coil and said seat and spiral shape coil pattern of said position-detecting coil are layered in said third direction.

7. The anti-shake apparatus according to claim 1, wherein said movable unit is located at the center of its movable range, in both said first and second directions, when a center area of one of said imaging device and said hand-shake correcting lens which is included in said movable unit, is located on said optical axis.

* * * * *